(12) United States Patent
Butsch et al.

(10) Patent No.: US 6,925,901 B2
(45) Date of Patent: Aug. 9, 2005

(54) DEVICE FOR CONVERTING ROTATIONAL MOVEMENT INTO AXIAL MOVEMENT

(75) Inventors: Michael Butsch, Daisendorf (DE); Jörg Henle, Weikersheim (DE)

(73) Assignee: Wittenstein AG, Igersheim (DE)

( * ) Notice: Subject to any disclaimer, the term of this patent is extended or adjusted under 35 U.S.C. 154(b) by 102 days.

(21) Appl. No.: 10/240,360

(22) PCT Filed: Dec. 12, 2000

(86) PCT No.: PCT/DE00/04423

§ 371 (c)(1),
(2), (4) Date: Sep. 30, 2002

(87) PCT Pub. No.: WO01/86171

PCT Pub. Date: Nov. 15, 2001

(65) Prior Publication Data

US 2003/0101836 A1 Jun. 5, 2003

(30) Foreign Application Priority Data

May 6, 2000 (DE) .......................... 100 22 115

(51) Int. Cl.⁷ ................................ F16H 1/18
(52) U.S. Cl. ................ 74/424.92; 74/424.89; 74/424.91
(58) Field of Search ................ 74/424.92, 424.89, 74/424.6, 89, 424.91

(56) References Cited

U.S. PATENT DOCUMENTS 3,861,221 A * 1/1975 Stanley ........................ 74/25
4,337,671 A * 7/1982 Ulf ........................ 74/424.94
4,964,314 A * 10/1990 Wilkes ........................ 74/424.92
5,501,117 A * 3/1996 Mensing et al. ............... 74/420

FOREIGN PATENT DOCUMENTS

| DE | 87 02 656  | 10/1987 |
| DE | 196 11 910 | 3/1996  |
| DE | 195 42 453 | 11/1996 |
| DE | 196 25 761 | 1/1997  |
| DE | 197 13 351 | 3/1997  |
| DE | 196 00 238 | 7/1997  |
| DE | 197 36 734 | 2/1998  |
| EP | 0 870 129  | 12/1996 |
| GB | 2 091 375  | 7/1982  |

* cited by examiner

Primary Examiner—David M. Fenstermacher
(74) Attorney, Agent, or Firm—Collard & Roe, P.C.

(57) ABSTRACT

A device for converting rotational movement into axial movement includes planetary rollers driven by a drive shaft projecting from a drive device and maintained peripherally at a same distance, in addition to a push body axially displaced by the planetary rollers. These planetary rollers are peripherally fixed on a support which is driven around the axis thereof, the rollers being rotationally mounted and provided with peripheral grooves or threaded grooves; the support is connected in a fixed manner to the drive shaft rotating around its axis; the planetary rollers engage in at least one thread-like groove of the push body that is displaced along the axis of the support by means of their peripheral grooves or threaded grooves. The support drives the planetary rollers; the push body is embodied as a hollow body encompassing the planetary rollers; a bearing body that has peripheral bearing grooves or threaded grooves and that can rotate independently around its axis relative to the drive shafts and concentrically inside the planetary rollers is provided in the center of the support.

2 Claims, 1 Drawing Sheet

DEVICE FOR CONVERTING ROTATIONAL MOVEMENT INTO AXIAL MOVEMENT

CROSS REFERENCE TO RELATED APPLICATIONS

Applicants claim priority under 35 U.S.C. §119 of German Application No. 100 22 115.7 filed May 6, 2000. Applicants also claim priority under 35 U.S.C. §365 of PCT/DE00/04423 filed Dec. 12, 2000. The international application under PCT article 21(2) was not published in English.

BACKGROUND OF THE INVENTION

1. Field of the Invention

This invention relates to a device for converting a rotational movement into an axial movement.

2. The Prior Art

Such a device is known from European Patent 0 870 129 B1.

SUMMARY OF THE INVENTION

This invention is concerned with the object of creating a simpler and functionally better support of the bearing body, which receives the axial forces of the planetary rollers.

The present invention achieves this object.

An embodiment of the invention has the advantage that the drive mechanism can be arranged in a space-saving manner in the axial direction, either at an angle to or parallel to the axis of rotation of the thrust body or the support of the planetary rollers.

A further embodiment defines advantageous special devices according to this invention. A short-stroke engine or a geared engine may be used as the drive unit. The belt pulleys may be in particular those used on CVT gears (CVT=continuously variable transmission) in the form of two pairs of belt pulleys with a belt or chain for infinitely adjustable changes in transmission ratio. One pair of belt pulleys must be used to change the transmission ratio and the other must be adjusted axially to achieve the prestress of the tension means. One disadvantage of the hydraulic systems used for this purpose in the past is a poor efficiency, which is improved significantly by the method according to this invention.

The brake shoe linings to be adjusted axially are brake linings on disk and drum brakes having a known design. The brake linings can be adjusted better through the control technology with the device according to this invention, which operates electromechanically, than with the hydraulically operated systems used for this purpose in the past. This is true in particular with so-called brake-by-wire systems, which do not require any mechanical connection with an actuating means to be operated by the driver.

Another application is the operation of clutch elements, e.g., on multi-disk clutches, where a reverse self-locking design is especially advantageous energetically.

This invention is based on the general idea of supporting the bearing body in bearings, which are supported on stationary areas of the drive mechanism used with the device according to this invention.

BRIEF DESCRIPTION OF THE DRAWINGS

One embodiment of this invention is illustrated in the drawing.

The only FIGURE shows.

DETAILED DESCRIPTION OF PREFERRED EMBODIMENTS

Figure 1:
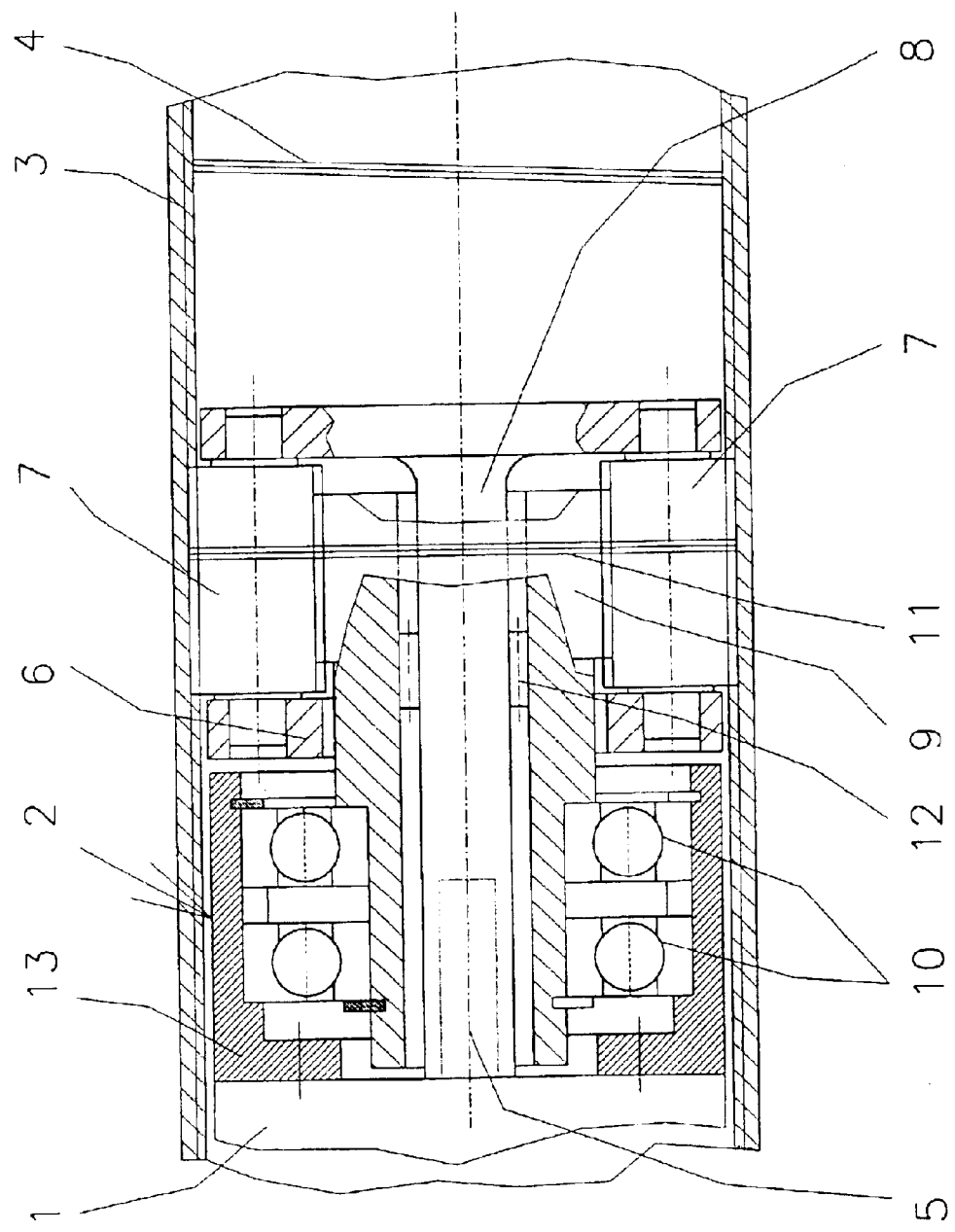
FIG. 1 shows a device for converting a rotational movement into an axial movement in a front view in part and in a longitudinal section in another part.

The device referred to below as a linear actuator for converting a rotational movement into an axial movement has two oppositely longitudinally displaceable parts, namely a drive mechanism 1 having a cylindrical guide area 2 and a tubular thrust body 3 which is slidably mounted on the guide area 2 of the drive mechanism 1.

The drive mechanism 1 may also be arranged in an axial offset relative to the drive shaft 5 according to the invention. In this case, the force may be transmitted over a gearwheel drive or a belt drive. In the case of an arrangement of drive mechanism 1 and drive shaft 5 having the same axis, the drive mechanism 1 may be provided inside or outside the path of displacement of the thrust body 3.

On the cylindrical inside surface, the thrust body 3 is provided with a threaded groove 4.

From the drive mechanism 1, a drive shaft 5 drives a support 6 in which the planetary rollers 7 are rotatably mounted. The planetary rollers 7 are provided with peripheral grooves or threaded grooves, which mesh with the threaded groove 4 on the thrust body 3. Therefore, there is a relative displacement between the drive mechanism 1 and the thrust body 3 in the case of a driven support 6.

The connection of support 6 to the drive shaft 5 is accomplished via a shaft 8, which is fixedly connected to the drive shaft 5 and support 6. The shaft 8 may also be designed in one piece with the support 6.

A bearing body 9 is used to support the axial forces occurring in the planetary rollers 7 in operation of the linear actuator. This bearing body 9 is designed as a hollow shaft which is secured axially by roller bearings 10, and is rotatably mounted on a ring 13 which is fixedly connected to the housing of the drive mechanism 1. In the area in which this bearing body 9 is radially inside the planetary rollers 7, it has bearing grooves 11, which engage in the grooves of the planetary rollers 7. The shaft 8, by means of which the support 6 is connected to the drive shaft 5, passes through the bearing body 9.

Support by roller bearings 12 is provided between the bearing body 9 and the shaft 8.

What is claimed is:

1. A device for converting a rotational movement into an axial movement, having a planetary roller (7) driven by a drive shaft (5) coming out of a drive mechanism (1) and held at a uniform distance on the circumference, and having a thrust body (3) that is axially displaceable by the planetary rollers (7), whereby the planetary rollers (7) are secured at the periphery in a support (6) which is driven about its axis, they are rotationally mounted and provided with peripheral grooves or threaded grooves, the support (6) is connected in a fixed-torque manner to the drive shaft (5) which rotates about its axis, the planetary rollers (7) engage in at least one thread-like groove on the thrust body (3) which is displaceable along the axis of the support (6) by way of their peripheral grooves or threaded grooves, the support (6) drives the planetary rollers (7), the thrust body (3) is a hollow body which encloses the planetary rollers (7), at the center of the support (6) concentrically inside the planetary rollers (7), a bearing body (9) is provided; it can rotate independently of the drive shaft (5) about its axis, having an area of peripheral bearing grooves (11) or threaded grooves, said bearing grooves (11) or threaded grooves engaging in respective peripheral grooves or threaded grooves on the planetary rollers (7), wherein the bearing body (9) is tubular and is rotatably mounted and is axially secured at one end relative to the drive mechanism (1), for a torque-fixed connection of the support (6) to the drive shaft (5), an area of the support (6) which a shaft (8) fixedly connected to this support (6), passes through the center of the bearing body (9) and said shaft (8) rotates on bearings (12) located between said shaft (8) and said support (6).

2. The device according to claim 1, for adjusting a belt pulley or a brake lining and for actuation of clutch elements in motor vehicles.

\* \* \* \* \*